United States Patent
Goldstein (10) Patent No.: US 7,765,814 B2
(45) Date of Patent: Aug. 3, 2010

(54) SENSOR ASSEMBLY FOR DETECTING ICE CRYSTAL FORMATION ON HEAT EXCHANGE SURFACE AND ICE-MAKING MACHINE INCORPORATING THE SAME

(75) Inventor: Vladimir Goldstein, Woodbridge (CA)

(73) Assignee: Sunwell Engineering Company Limited, Ontario (CA)

( * ) Notice: Subject to any disclaimer, the term of this patent is extended or adjusted under 35 U.S.C. 154(b) by 162 days.

(21) Appl. No.: 11/907,077

(22) Filed: Oct. 9, 2007

(65) Prior Publication Data

US 2008/0029245 A1 Feb. 7, 2008

Related U.S. Application Data

(62) Division of application No. 11/095,540, filed on Apr. 1, 2005, now Pat. No. 7,296,425.

(51) Int. Cl.
*F25C 1/00* (2006.01)
*F25D 21/00* (2006.01)
*F25D 21/10* (2006.01)
*F25D 21/06* (2006.01)

(52) U.S. Cl. ............ 62/135; 62/150; 62/282; 62/284

(58) Field of Classification Search .......... 62/66, 62/135–140, 150, 282, 284
See application file for complete search history.

(56) References Cited

U.S. PATENT DOCUMENTS

| | | | |
|---|---|---|---|
| 4,105,064 A | 8/1978 | Del Toro et al. | |
| 4,796,441 A | 1/1989 | Goldstein | |
| 4,986,081 A | 1/1991 | Hida et al. | |
| 5,884,501 A | 3/1999 | Goldstein | |
| 6,056,046 A | 5/2000 | Goldstein | |
| 6,305,189 B1 | 10/2001 | Menin | |
| 6,915,647 B2 * | 7/2005 | Tsuchikawa et al. | ......... 62/129 |
| 2005/0276696 A1 | 12/2005 | LeMieux | |

* cited by examiner

*Primary Examiner*—Marc E Norman
(74) *Attorney, Agent, or Firm*—Harness, Dickey & Pierce, P.L.C.

(57) ABSTRACT

A sensor assembly for detecting ice crystal formation on a heat exchange surface in an ice-making machine comprises at least one microphone monitoring the sound made by a rotating blade assembly within the ice-making machine during ice slurry formation. A filter filters the output of the microphone to remove background noise. A comparator receives the output of the filter and compares the filtered microphone output with a threshold to determine if the filtered microphone output signifies ice crystal formation on the heat exchange surface. The operation of the ice-making machine can then be adjusted in a manner to allow the formed ice crystals to be removed from the heat exchange surface.

8 Claims, 8 Drawing Sheets

FREEZE-UP SENSOR OUTPUT (VOLTS) VS. TIME (SEC.) FOR 18 GPM FLOW

FIG. 4g

AGITATOR CURRENT (AMPS) VS. TIME (SEC.) FOR 18 GPM FLOW

FIG. 4h

COMPRESSOR CURRENT (AMPS) VS. TIME (SEC.) FOR 18 GPM FLOW

SENSOR ASSEMBLY FOR DETECTING ICE CRYSTAL FORMATION ON HEAT EXCHANGE SURFACE AND ICE-MAKING MACHINE INCORPORATING THE SAME

This application is a Divisional Application of U.S. application Ser. No. 11/095,540, filed Apr. 1, 2005 now U.S. Pat. No. 7,296,425, the entire contents of all of which are hereby incorporated herein by reference.

FIELD OF THE INVENTION

The present invention relates to ice-making machines and in particular to a sensor assembly for detecting ice crystal formation on a heat exchange surface and to an ice-making machine incorporating the same. The present invention also relates to an ice-making process.

BACKGROUND OF THE INVENTION

Ice-making machines that cool a brine solution to form an ice-brine slurry are known in the art. For example, U.S. Pat. No. 4,796,441 to Goldstein, assigned to the assignee of the present application, discloses an ice-making machine having a chamber with a fluid inlet to receive a brine solution from which ice is to be made and a fluid outlet to permit the egress of an ice-brine slurry from the chamber. The interior surface of the chamber defines a heat exchange surface. A tubular jacket surrounds the chamber. A refrigerant inlet and a refrigerant outlet communicate with the space between the jacket and chamber and are positioned at opposite ends of the ice-making machine. Refrigerant flowing through the space between the inlet to the outlet boils and in so doing, cools the brine solution in contact with the heat exchange surface. Refrigerant leaving the ice-making machine via the outlet is condensed and compressed before being fed back to the refrigerant inlet. A blade assembly is mounted on a rotatable shaft extending through the center of the chamber and is in contact with the heat exchange surface. A motor rotates the shaft so that the blade assembly removes a cooled layer of brine solution in contact with the heat exchange surface and directs the removed cooled layer into a body of brine solution within the chamber. The shaft is rotated at a rate such that the interval between successive passes of the blade assembly over the heat exchange surface inhibits the formation of ice crystals on the heat exchange surface.

U.S. Pat. Nos. 5,884,501 and 6,056,046 to Goldstein disclose an ice-making machine including a housing having a brine solution inlet to receive brine solution from which ice is to be made and an ice-brine slurry outlet to permit the egress of an ice-brine slurry from the housing. A heat exchanger within the housing has a heat exchange surface, a refrigerant inlet, a refrigerant outlet and at least one refrigerant circuit interconnecting the refrigerant inlet and the refrigerant outlet. Refrigerant flows through the at least one refrigerant circuit between the refrigerant inlet and the refrigerant outlet to extract heat from the brine solution contacting the heat exchange surface. A blade assembly within the housing carries a plurality of blades, each of which is in contact with the heat exchange surface. The blade assembly is mounted on a shaft, which is rotated by a motor at a rate such that the blades move across the heat exchange surface and remove cooled fluid therefrom thereby to inhibit the deposition of ice crystals on the heat exchange surface.

U.S. Pat. No. 6,305,189 to Menin discloses an installation for the continuous crystallization of liquids by freezing to form a bubble slurry with crystal nuclei, gas bubbles and concentrated unfrozen liquid. The installation includes a pumpless refrigeration circuit with a compressor, a water condenser, a cooling tower, an indirect refrigerated evaporator, an expansion valve, a low pressure receiver and a refrigeration accessories for volumetric crystallization of liquid flowing through the refrigerated evaporator. The installation performs preliminary liquid cooling at a predetermined temperature, adding gas into the cooled liquid and their intermixing, delivering mixed liquid and gas through the refrigerated evaporator and winding round the mixed liquid and gas into the refrigerated evaporator. Plastic wipers in the tube of the refrigerated evaporator move a cooled layer of the liquid mixed with gas bubbles (LMGB) in a spiral path towards the central longitudinal axis of the tube.

In order to maintain efficiency in ice-making machines of the above-described type, it is desired to inhibit the formation of ice on the heat exchange surfaces. As a result, in such ice-making machines the wipers or blades are typically moved over the heat exchange surfaces at a rate selected to avoid ice layer formation. Despite doing this, during the course of operation, ice crystals sometimes form on the heat exchange surfaces leading to the formation of ice layers on the heat exchange surfaces. When such an ice layer forms on the heat exchange surface, the ice layer acts as an insulator and reduces the efficiency of the ice-making machine. At this point it is often necessary to stop operation of the ice-making machine until the ice layer on the heat exchange surface melts. If the ice layer achieves any substantial thickness, the time required for the ice layer to melt can be significant. As will be appreciated, it is desired to determine when ice crystals begin forming on the heat exchange surface so that immediate steps can be taken to inhibit an ice layer from forming on the heat exchange surface.

It is therefore an object of the present invention to provide a novel sensor assembly for detecting ice crystal formation on a heat exchange surface and an ice-making machine incorporating the same. It is also an object of the present invention to provide a novel ice-making process.

SUMMARY OF THE INVENTION

Accordingly, in one aspect there is provided a sensor assembly for detecting ice crystal formation on a heat exchange surface in an ice-making machine comprising:

at least one sensor monitoring a parameter during ice formation; and a comparator in communication with said sensor, said comparator comparing the monitored parameter with a threshold to determine if said monitored parameter signifies ice crystal formation on said heat exchange surface.

In one embodiment, the comparator generates an output signal when the monitored parameter signifies ice crystal formation on the heat exchange surface. The at least one sensor is a microphone and the parameter is the sound made by a moving blade assembly of the ice-making machine. The comparator generates the output signal when the sound level exceeds the threshold. The ice-making machine may produce an ice-brine slurry with the blade assembly being rotated to move across a generally cylindrical heat exchange surface. A filter interposed between the sensor and the comparator inhibits signals below a threshold frequency from being applied to the comparator.

In one embodiment, the processing device communicates with the sensor assembly and conditions the ice-making machine to operate in a manner to allow formed ice crystals to be removed from the heat exchange surface upon detection of ice crystal formation on the heat exchange surface. The processing device may interrupt condensing and compressing of refrigerant flowing through the ice-making machine upon detection of ice crystal formation on the heat exchange surface. The sensor assembly senses a change in sound produced by the ice-making machine thereby to detect ice crystal formation on the heat exchange surface. The change in sound may be an increase in sound produced by movement of the at least one blade across the heat exchange surface.

According to still yet another aspect there is provided an ice-making process comprising:

contacting a heat exchange surface cooled by flowing refrigerant with a brine solution;

removing a layer of cooled brine solution from said heat exchange surface prior to ice crystallization thereon using a blade assembly;

monitoring sound produced by movement of the blade assembly across said heat exchange surface during said removing; and altering the refrigerant flow process upon detection of ice crystal formation on said heat exchange surface.

In one embodiment, the layer of cooled brine solution is removed from the heat exchange surface by a rotating blade assembly. During the altering, compressing of the flowing refrigerant is altered.

The sensor assembly provides advantages in that since ice crystal formation on the heat exchange surface can be detected before an ice layer of significant thickness forms on the heat exchange surface, the operation of the ice-making machine can be adjusted to remove formed ice crystals without requiring significant downtime in the operation of the ice-making machine operation. This allows the ice-making machine to operate efficiently and generally continuously.

In another embodiment, the at least one sensor is a pressure sensor. The comparator generates the output signal when refrigerant pressure within the ice-making machine drops below the threshold.

In yet another embodiment, the at least one sensor is a temperature sensor. The comparator generates the output signal when refrigerant temperature within the ice-making machine drops below the threshold.

According to another aspect there is provided a sensor assembly for detecting ice crystal formation on a heat exchange surface in an ice-making machine comprising:

at least one microphone monitoring the sound made by a rotating blade assembly within said ice-making machine during ice slurry formation;

a filter filtering the output of said microphone to remove background noise; and a comparator receiving the output of said filter and comparing the filtered microphone output with a threshold to determine if the filtered microphone output signifies ice crystal formation on said heat exchange surface.

According to yet another aspect there is provided an ice-making machine comprising:

a housing having an inlet to receive a fluid from which ice is to be made and an outlet to permit the egress of ice from said housing;

a heat exchanger having at least one heat exchange surface, a refrigerant inlet, a refrigerant outlet and at least one refrigerant passage interconnecting said refrigerant inlet and said refrigerant outlet to permit a flow of refrigerant through said heat exchanger to extract heat from fluid contacting said at least one heat exchange surface;

at least one blade in contact with said at least one heat exchange surface and movable across said at least one heat exchange surface to remove cooled fluid therefrom;

a drive moving said blade across said heat exchange surface; and a sensor assembly detecting ice crystal formation on said heat exchange surface.

BRIEF DESCRIPTION OF THE DRAWINGS

Embodiments will now be described more fully with reference to the accompanying drawings in which:

FIG. 2b is a circuit diagram of the sensor assembly of FIG. 2a;

FIG. 3 is a side elevational view of a portion of the ice-making machine showing the sensor assembly of FIG. 2a;

DETAILED DESCRIPTION OF THE EMBODIMENTS

Figure 1:
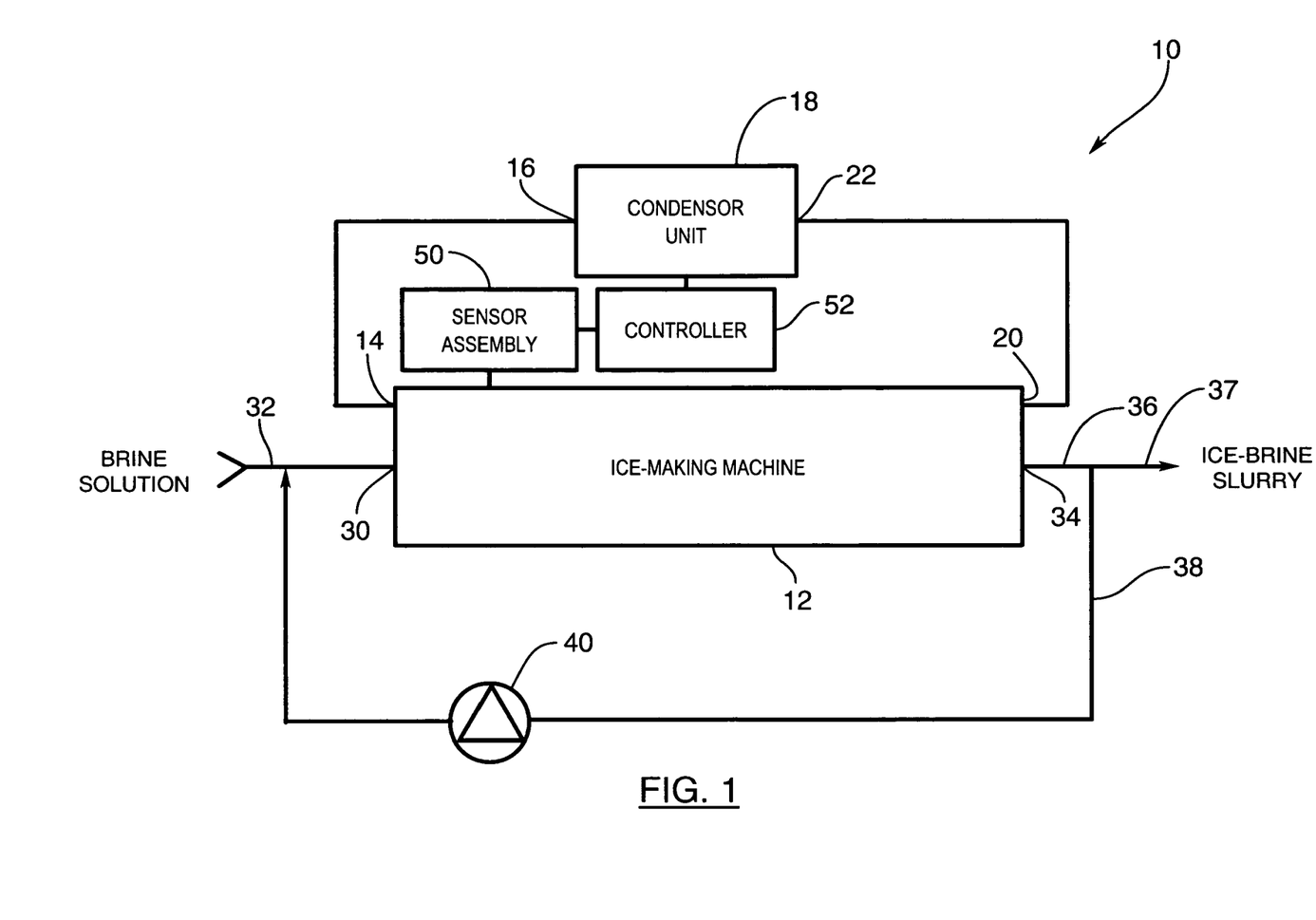
FIG. 1 is a schematic diagram of an ice-making system including an ice-making machine for cooling a brine solution to form an ice-brine slurry.

Turning now to FIG. 1, an ice-making system is shown and is generally identified by reference numeral 10. Ice-making system 10 includes an ice-making machine 12 that cools a brine solution to form an ice-brine slurry such as those previously identified. The ice-making machine 12 includes a refrigerant inlet 14 connected to the outlet 16 of a condenser unit 18 and a refrigerant outlet 20 connected to the inlet 22 of the condenser unit 18. The condenser unit 18 condenses and compresses refrigerant exiting the ice-making machine 12 before recirculating the refrigerant to the ice-making machine. The ice-making machine 12 also includes a brine solution inlet 30 connected to an inlet conduit 32 and an ice-brine slurry outlet 34 connected to a discharge conduit 36. Discharge conduit 36 leads to a discharge nozzle 37 as well as to a recirculation conduit 38, which in turn leads back to the inlet conduit 32. A pump 40 is positioned along the recirculation conduit 38 to recirculate ice-brine slurry. The amount of brine solution entering the inlet conduit 32 and mixing with recirculated ice-brine slurry is controlled to allow the ice fraction of ice-brine slurry produced by the ice-making machine 12 to be adjusted as desired.

The ice-making machine 12 in this embodiment is of the type described in U.S. Pat. Nos. 5,884,501 and 6,056,046, the contents of which are incorporated herein by reference. Ice-making machine 12 includes an ice generator tube 12a (see FIG. 3) having a cylindrical internal heat exchange surface. A blade assembly is disposed within the tube 12a and includes a plurality of blades in contact with the heat exchange surface. The blade assembly is mounted on a shaft driven by a motor 12b via a transmission 12c. Refrigerant entering the ice-making machine 12 via the refrigerant inlet 14 passes through refrigerant circuits in proximity to the heat exchange surface before exiting the ice-making machine 12 via the refrigerant outlet 20.

Ice-making machine system 10 further includes a sensor assembly 50 for detecting ice crystal formation on the heat exchange surface of the ice-making machine 12. The sensor assembly 50 communicates with a controller 52 that in turn communicates with the condenser unit 18. In this manner, when ice crystal formation on the heat exchange surface of the ice-making machine 12 is detected by the sensor assembly 50, the operation of the condenser unit 18 is controlled to enable any such formed ice crystals to melt and/or otherwise be removed from the heat exchange surface.

The general operation of the ice-making system 10 will now be described. In operation, brine solution or ice-brine slurry (hereinafter referred to as brine solution) is fed into the ice-making machine 12 via the inlet conduit 32 and brine solution inlet 30. Brine solution entering the ice-making machine 12 is directed towards the heat exchange surface therein. While this is occurring, condensed and compressed refrigerant enters the ice-making machine 12 by way of the refrigerant inlet 14. The refrigerant in turn flows through the refrigerant circuits thereby to cool the heat exchange surface before exiting the ice-making machine 12 via the refrigerant outlet 20. As the refrigerant flows through the refrigerant circuits, the refrigerant absorbs heat through the heat exchange surface and boils. The brine solution in contact with the heat exchange surface is thus supercooled.

To avoid deposition of ice on the heat exchange surface, which would inhibit heat transfer to the refrigerant and thereby reduce the efficiency of the ice-making machine 12, the blade assembly is rotated by the motor 12$b$ at a rate that is fast enough to allow the blades to remove the supercooled brine solution from the heat exchange surface prior to crystallization of ice crystals on the heat exchange surface. The supercooled brine solution therefore crystallizes in the body of brine solution within the tube 12$a$ allowing the brine solution to act as a secondary refrigerant in the formation of fine ice crystals throughout the brine solution.

Although the ice-making machine 12 is operated in a manner designed to avoid the formation of ice crystals on the heat exchange surface, in some instances ice crystals may still form on the heat exchange surface. Sensor assembly 50 detects when such ice crystals form on the heat exchange surface allowing the operation of the ice-making system 10 to be adjusted to remove such formed ice crystals from the heat exchange surface.

Figure 2A:
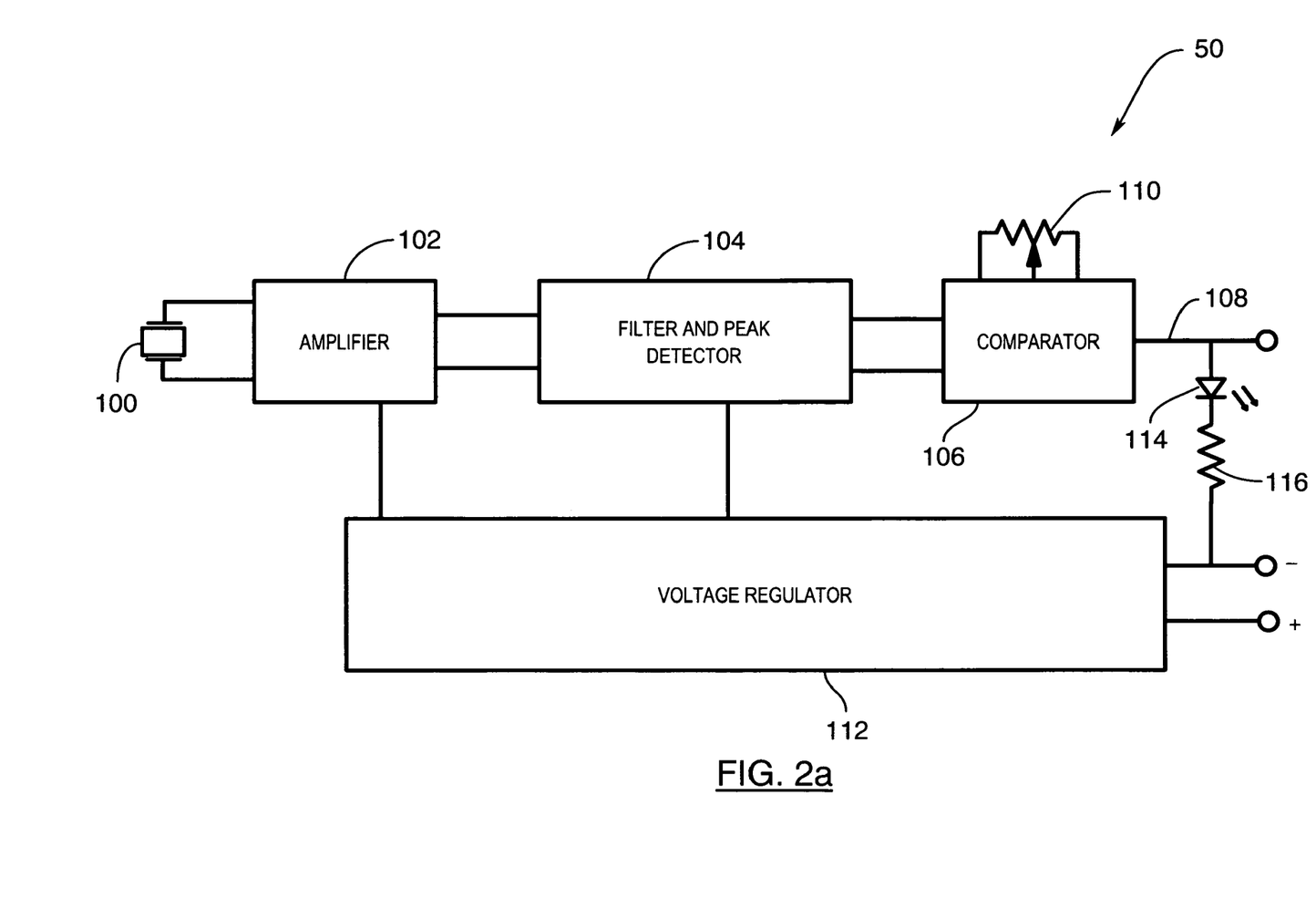
FIG. 2a is a block diagram of a sensor assembly for detecting ice crystal formation on a heat exchange surface forming part of the ice-making system of FIG. 1.
Figure 2B:
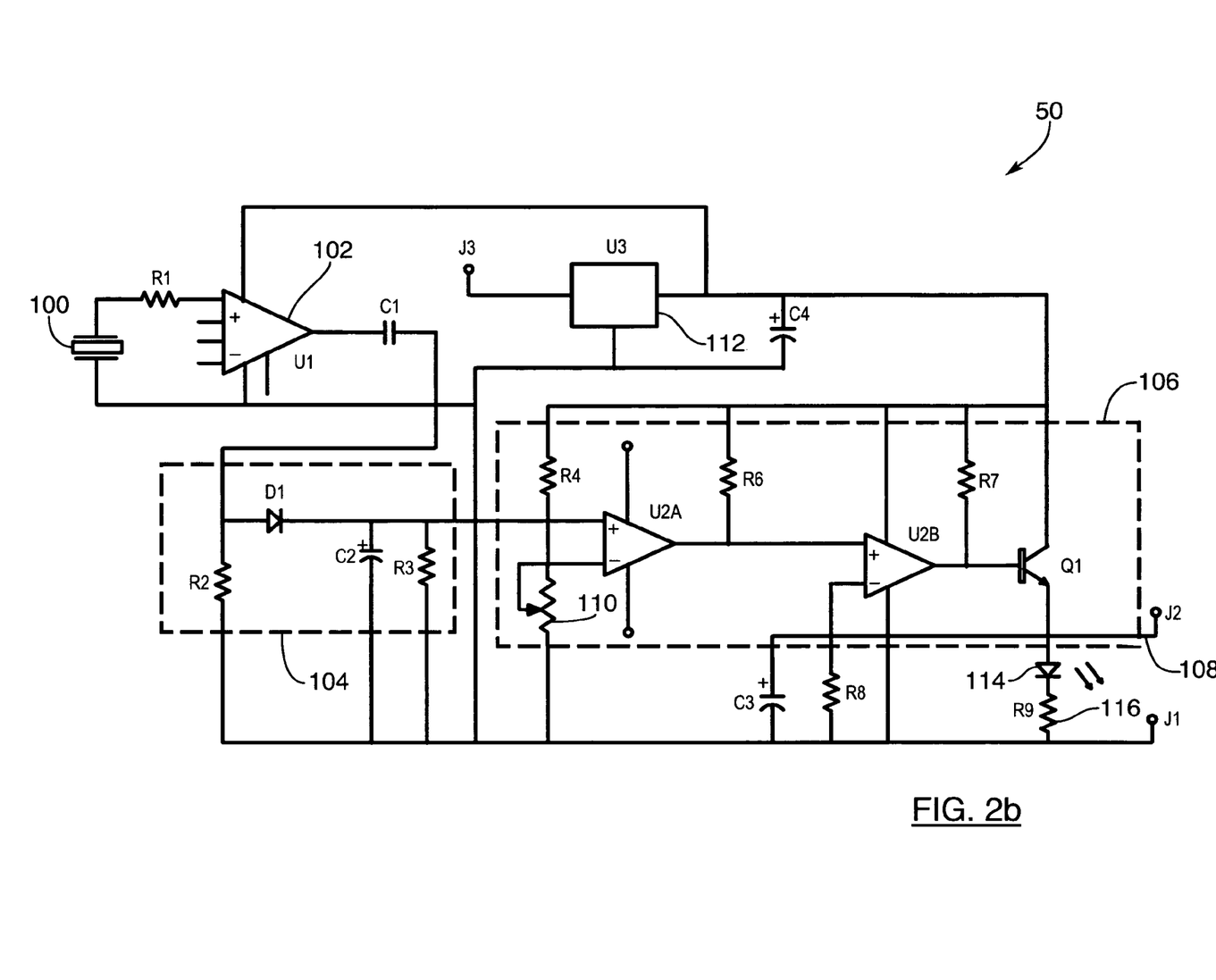
Figure 3:
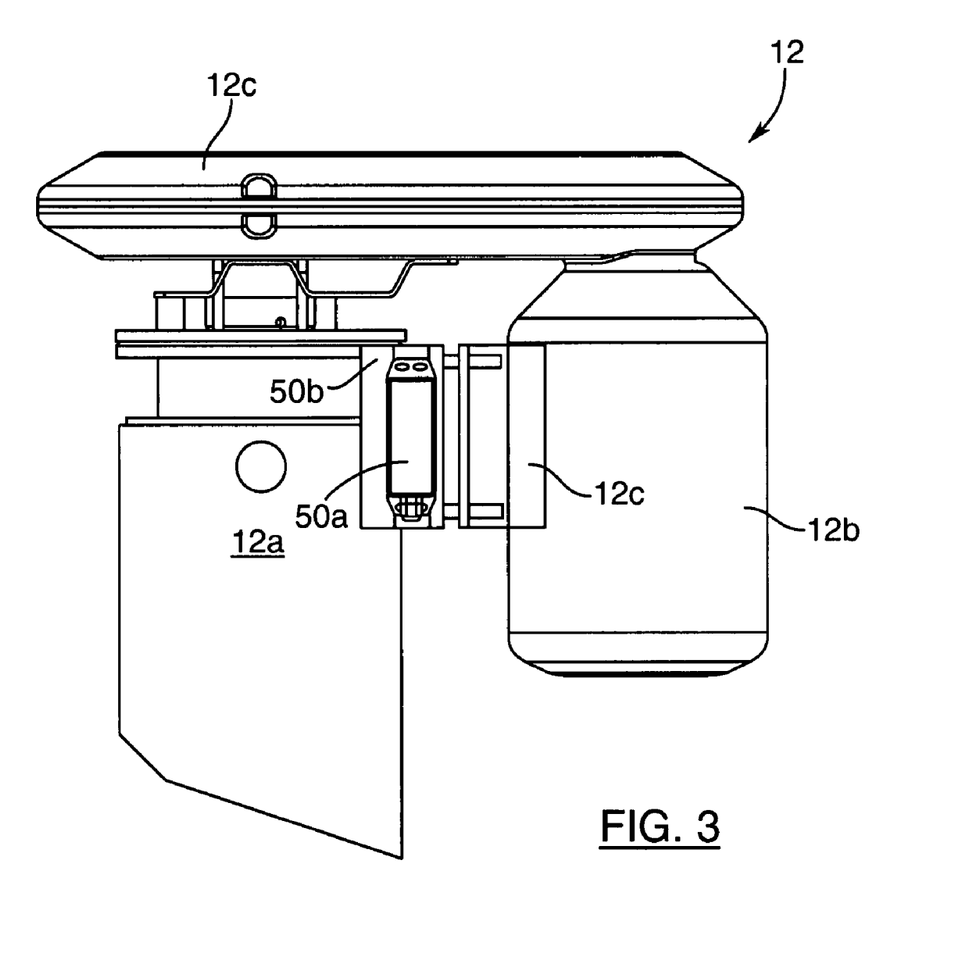

Turning now to FIGS. 2$a$, 2$b$ and 3, the sensor assembly 50 is better illustrated. As can be seen, sensor assembly 50 includes a transducer 100 in the form of a microphone that monitors and picks up sound generated within the tube 12$a$ as the blade assembly rotates within the ice-making machine 12. The transducer 100 is coupled to an operational amplifier 102, which in turn provides input to a filter and peak detector 104. Filter and peak detector 104 acts as a bandstop for input signals having a frequency below 1 KHz thereby to remove low frequency background noise from the transducer output. A comparator 106 is coupled to the filter and peak detector 104 and generates an output signal that is applied to an output line 108 leading to controller 52 when the output of the filter and peak detector 104 exceeds a threshold level set by a potentiometer 110. A voltage regulator 112 coupled to a +/−24 volt power source (not shown) supplies power to the amplifier 102, filter and peak detector 104 and comparator 106. A light emitting diode (LED) 114 and resistor 116 extend between the output line 108 and the power source. The LED 114 illuminates when an output signal appears on the output line 108 to signify visually an ice crystal formation condition.

The components of the sensor assembly 50 are accommodated by a housing 50$a$ that is mounted on a bracket 50$b$ fastened to the tube 12$a$ adjacent the driven end of the blade assembly. The bracket 50$b$ is also fastened to a bracket 50$c$ secured to the motor 12$b$. The housing 50$a$ and brackets 50$b$ and 50$c$ are formed of metal allowing noise and vibration generated within the tube 12$a$ to propogate thereby to facilitate pick up by the transducer 100.

Prior to operation, the sensor assembly 50 is calibrated to take into account the fact that formation of an ice layer on the heat exchange surface is dependent on the input brine solution flow rate, noise and blade assembly vibration levels are greater at lower input brine solution flow rates than at higher input brine solution rates and the time taken to remove ice layers formed on the heat exchange surface increases as the input brine solution flow rate decreases.

During normal operation of the ice-making machine 12, i.e. when no ice crystals are forming on the heat exchange surface and with the sensor the assembly 50 calibrated, the blade assembly rotates within the tube 12$a$ with little vibration and noise. As a result, the amplified output of the transducer 100 includes only a small signal component in the pass range of the filter and peak detector 104 that is below the threshold level of the comparator 106 as established by the potentiometer 110. Thus, the comparator 106 does not generate any output. However, when ice crystals begin to form on the heat exchange surface, the blade assembly vibrates within the tube 12$a$ as a result of scratching contact between its blades and the ice crystals creating significantly more sound. The transducer 100 picks up the sound resulting from the blade assembly vibration and provides output to the amplifier 102. The amplified transducer output in this case includes a large signal component in the pass range of the filter and peak detector 104 that is above the threshold of the comparator 106 as established by the potentiometer 110. Thus, the comparator 106 generates an output signal that is applied to the output line 108 resulting in the LED 114 illuminating.

When an output signal appears on the output line 108, the controller 52 conditions the condenser unit 18 to interrupt the refrigeration process. With the refrigeration process interrupted, ice crystals that have formed on the heat exchange surface melt allowing the ice crystals to separate easily from the heat exchange surface. As a result, the rotating blades in contact with the heat exchange surface are able to remove the ice crystals and thus free the heat exchange surface substantially of ice crystals. When the ice crystals have been removed from the heat exchange surface, the sound produced by the blade assembly drops resulting in the output signal being removed from the output line 108. When this occurs, the controller 52 conditions the condenser unit 18 to recommence the refrigeration process thereby to restore the ice-making system 10 to normal operation. On average, the refrigeration process is interrupted for an interval of between about one (1) to three (3) minutes. This period of time is generally sufficient to free the heat exchange surface of ice crystals. The interval may however be shorter or longer depending on the nature of the ice crystal formation on the heat exchange surface.

A number of trials were performed to evaluate the operation of the sensor assembly 50 for different brine solution flow rates into the ice-making machine 12. In particular, three trials at different brine solution flow rates were performed, namely at brine solution flow rates of six (6) gallons per minute (GPM), twelve (12) GPM and eighteen (18) GPM. In the first trial with the brine solution flow rate set at 6 GPM, the temperature of the brine solution at the brine solution inlet 30 was recorded. The condenser unit 18 was then turned on and the ice-making machine 12 was run until the LED 114 of the sensor assembly 50 turned on for a duration greater than three (3) seconds signifying the formation of an ice layer on the heat exchange surface. At this point, the discharge pressure at the ice-brine slurry outlet 34 and the suction pressure at the brine solution inlet 30 were recorded and the condenser unit 18 was turned off. The temperature of the ice-brine slurry at the ice-brine slurry outlet 34 was then recorded. After the ice layer on the heat exchange surface was removed, the motor 12b driving the blade assembly was turned off and then on signifying the end of the test. The above test was performed two (2) more times to complete the trial.

Figure 4A:
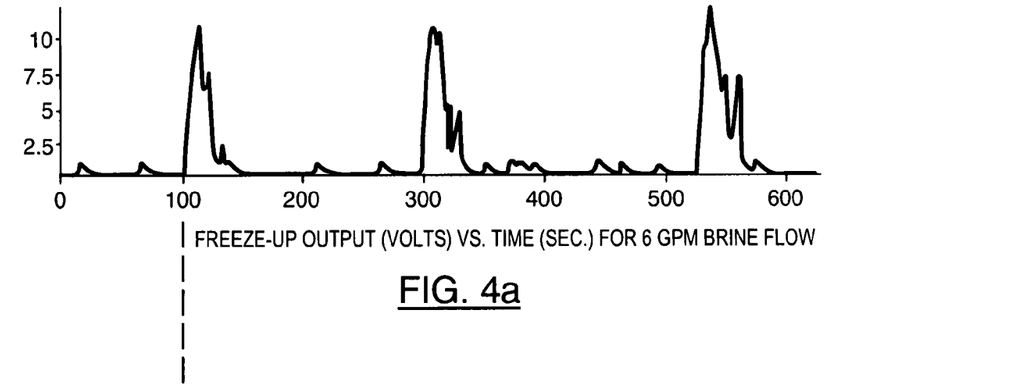
FIGS. 4a to 4i are graphs showing the results of trials performed to evaluate the operation of the sensor assembly of FIG. 2b for different input brine solution flow rates to the ice-making machine.
Figure 4B:
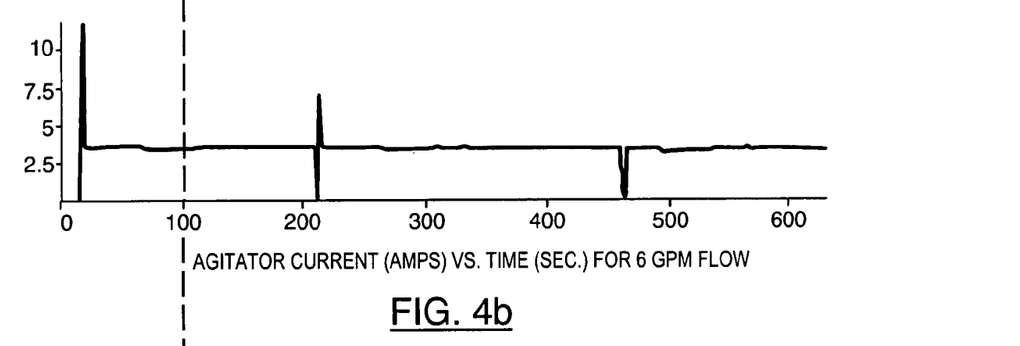
Figure 4C:
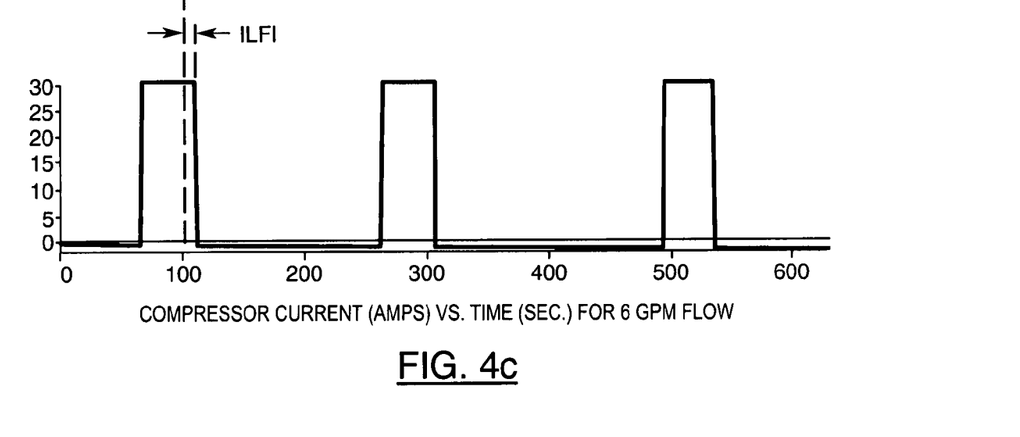

FIGS. 4a to 4c show graphs illustrating the results of the first trial. In particular, FIG. 4a is a graph showing sensor assembly signal output in volts versus time in seconds. FIG. 4b is a graph showing motor current in amps versus time in seconds. FIG. 4c is a graph showing condenser unit current in amps versus time in seconds. As can be seen in FIG. 4a, in this trial the time taken for an ice layer to form on the heat exchange surface is small as is the on time of the condenser unit 18. In particular, the ice layer formation interval ILFI extends from the beginning of a sensor assembly peak to the end of the associated condenser unit current peak. The time taken for the ice layer to be removed from the heat exchange surface extends from the end of the condenser unit current peak to the downward spike in the motor current, which was created by turning the motor 12b off and then on. The interval required to remove the ice layer from the heat exchange surface at a brine solution flow rate of 6 GPM is relatively lengthy.

Figure 4D:
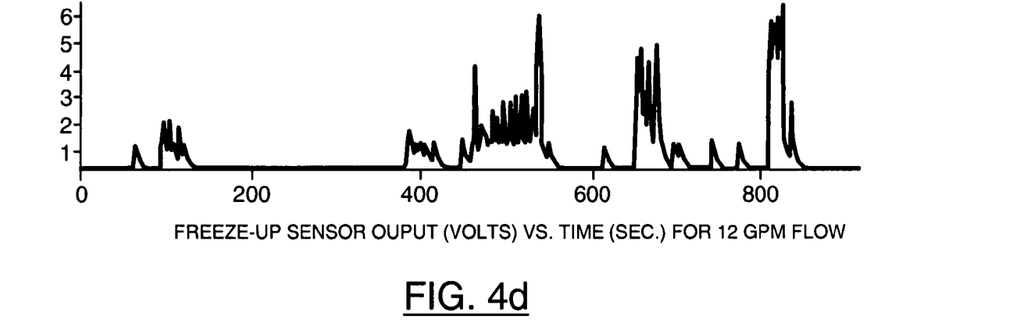
Figure 4E:
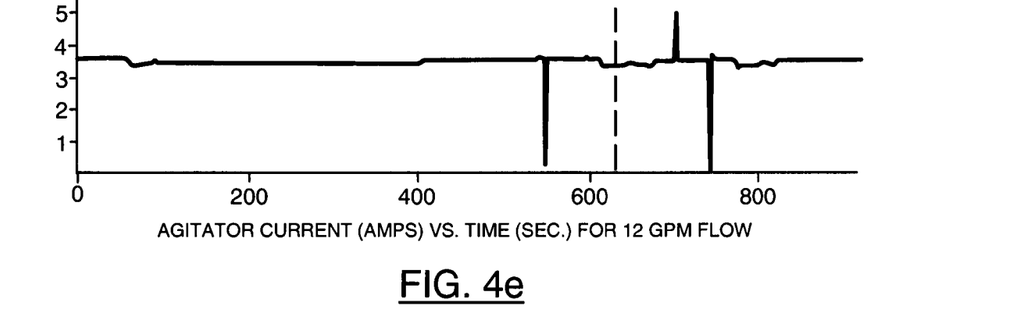
Figure 4F:
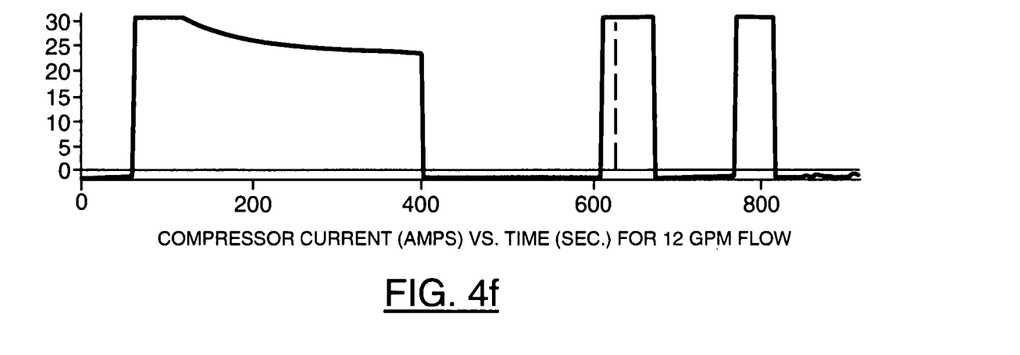

FIGS. 4d to 4f show graphs illustrating the results of the second trial. In particular, FIG. 4d is a graph showing sensor assembly signal output in volts versus time in seconds. FIG. 4e is a graph showing motor current in amps versus time in seconds. FIG. 4f is a graph showing condenser unit current in amps versus time in seconds. As can be seen in FIG. 4d, in this trial the sensor assembly 50 did not generate output signifying formation of the ice layer on the heat exchange surface until after the condenser unit 18 was turned off. In the next two tests, it can be seen that the sensor assembly 50 generated output signifying ice layer formation on the heat exchange surface relatively quickly. It can also be seen that at a brine solution flow rate of 12 GPM, the time taken for the ice layer to be removed from the heat exchange surface is shorter than at a brine solution flow rate of 6 GPM.

Figure 4G:
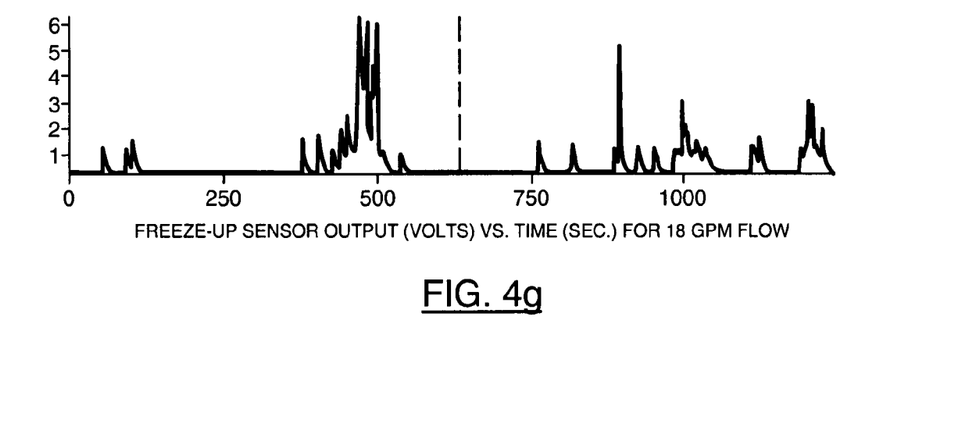
Figure 4H:
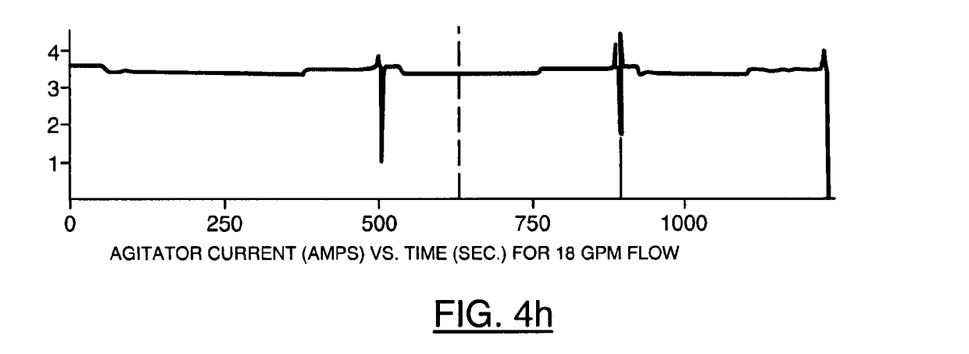
Figure 4I:
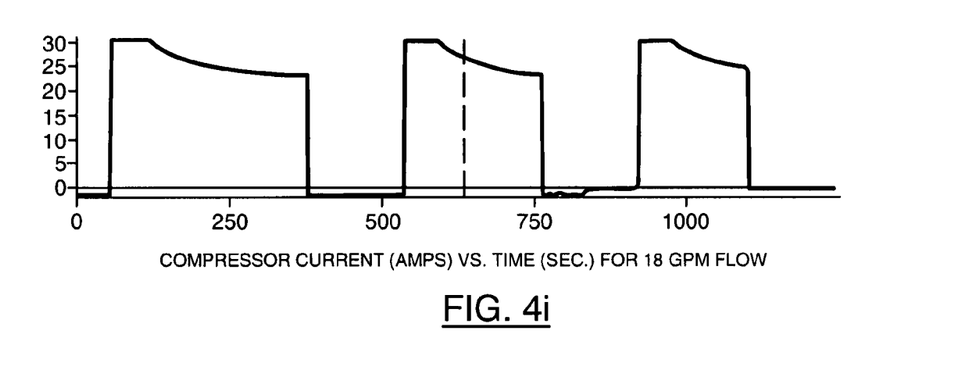

FIGS. 4g to 4i show graphs illustrating the results of the third trial. In particular, FIG. 4g is a graph showing sensor assembly signal output in volts versus time in seconds. FIG. 4h is a graph showing motor current in amps versus time in seconds. FIG. 4i is a graph showing condenser unit current in amps versus time in seconds. Similar to the second trial, as can be seen in FIG. 4g, the sensor assembly 50 did not generate output signifying formation of the ice layer on the heat exchange surface until after the condenser unit 18 was turned off. In the next two tests, it can be seen that the sensor assembly 50 generated output signifying ice layer formation on the heat exchange surface relatively quickly. It can also be seen that at a brine solution flow rate of 18 GPM, the time taken for the ice layer to be removed from the heat exchange surface is shorter than at brine solution flow rates of 6 and 12 GPM.

As can be seen from the graphs of FIGS. 4a to 4i, formation of the ice layer on the heat exchange surface is sometimes identified by a small spike in the motor current and thus, this can also be used as an ice layer formation indicator. However, using motor current as the ice layer formation indicator is not as reliable as sensing blade assembly noise and vibration as the motor current spikes are small and sometimes inconsistent.

Figure 5:
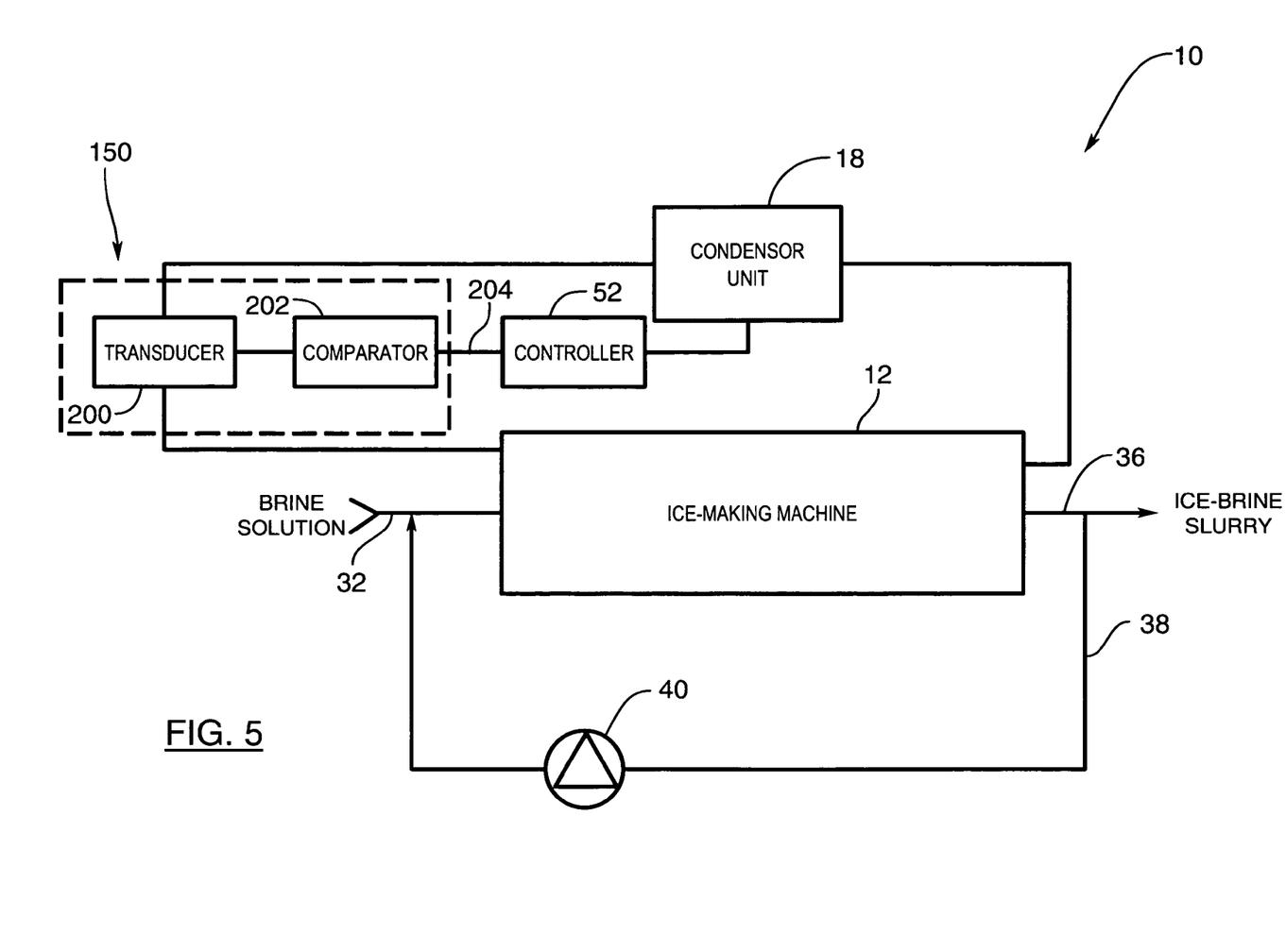
FIG. 5 is another embodiment of a sensor assembly for detecting ice crystal formation on a heat exchange surface.

Referring now to FIG. 5, another embodiment of a sensor assembly 150 for detecting ice crystal formation on the heat exchange surface is shown. In this embodiment, the sensor assembly 150 includes a pressure transducer 200 installed on the refrigerant line leading to refrigerant inlet 14 of the ice-making machine 12. The pressure transducer 200 measures the pressure of the refrigerant in the refrigerant line. As is known, for a given system size, the pressure at which the refrigerant evaporates is proportional to the efficiency of heat transfer between the brine solution and the refrigerant. Thus, the pressure at which the refrigerant evaporates is higher when the heat transfer efficiency is higher. The output of the pressure transducer 200 is conveyed to a comparator 202 that compares the pressure transducer output with a threshold level.

When the output of the pressure transducer 200 drops below the threshold level, signifying a decrease in heat transfer efficiency and hence ice crystal formation on the heat exchange surface, the comparator 202 provides an output signal on an output line 204 leading to the controller 52. When an output signal appears on the output line 204, the controller 52 conditions the condenser unit 18 to interrupt the refrigeration process allowing formed ice crystals to melt and separate easily from the heat exchange surface. When the output signal is removed from output line 204, the controller 52 conditions the condenser unit 18 to recommence the refrigeration process allowing the ice-making system 10 to resume its normal operation.

If desired, a temperature sensor can be used instead of a pressure transducer. As is known, the temperature at which the refrigerant evaporates is proportional to the efficiency of heat transfer between the brine solution and the refrigerant. Thus, the temperature at which the refrigerant evaporates is higher when the heat transfer efficiency is higher.

Although embodiments have been described, those of skill in the art will appreciate that variations and modifications may be made without departing from the spirit and scope thereof as defined by the appended claims.

What is claimed is:

1. An ice-making machine comprising:
   a housing having an inlet to receive a fluid from which ice is to be made and an outlet to permit the egress of ice from said housing;
   a heat exchanger having at least one heat exchange surface, a refrigerant inlet, a refrigerant outlet and at least one refrigerant passage interconnecting said refrigerant inlet and said refrigerant outlet to permit a flow of refrigerant through said heat exchanger to extract heat from fluid contacting said at least one heat exchange surface;
   at least one blade in contact with said at least one heat exchange surface and movable across said at least one heat exchange surface to remove cooled fluid therefrom;
   a drive moving said blade across said heat exchange surface;
   a sensor assembly sensing a change in sound produced by said ice-making machine thereby to detect ice crystal formation on said heat exchange surface; and
   a processing device communicating with said sensor assembly, said processing device conditioning said ice-making machine to operate in a manner to allow the formed ice crystals to be removed from said heat exchange surface upon detection of ice crystal formation on said heat exchange surface.

2. An ice-making machine according to claim 1 wherein said processing device interrupts condensing and compressing of refrigerant flowing through said ice-making machine upon detection of ice crystal formation on said heat exchange surface.

3. An ice-making machine according to claim 1 wherein said change in sound is an increase in sound produced by movement of said at least one blade across said heat exchange surface.

4. An ice-making machine according to claim 3 wherein said processing device interrupts condensing and compressing of refrigerant flowing through said ice-making machine upon detection of ice crystal formation on said heat exchange surface.

5. An ice-making process comprising:
   contacting a heat exchange surface cooled by flowing refrigerant with a brine solution;
   removing a layer of cooled brine solution from said heat exchange surface prior to ice crystallization thereon using a blade assembly;
   monitoring sound produced by movement of the blade assembly across said heat exchange surface during said removing; and
   altering the refrigerant flow process upon detection of ice crystal formation on said heat exchange surface.

6. The method of claim 5 wherein said layer of cooled brine solution is removed from said heat exchange surface by a rotating blade assembly.

7. The method of claim 6 wherein during said altering, compressing of said flowing refrigerant is altered.

8. The method of claim 5 wherein during said altering, compressing of said flowing refrigerant is altered.

* * * * *